United States Patent Office 3,712,800
Patented Jan. 23, 1973

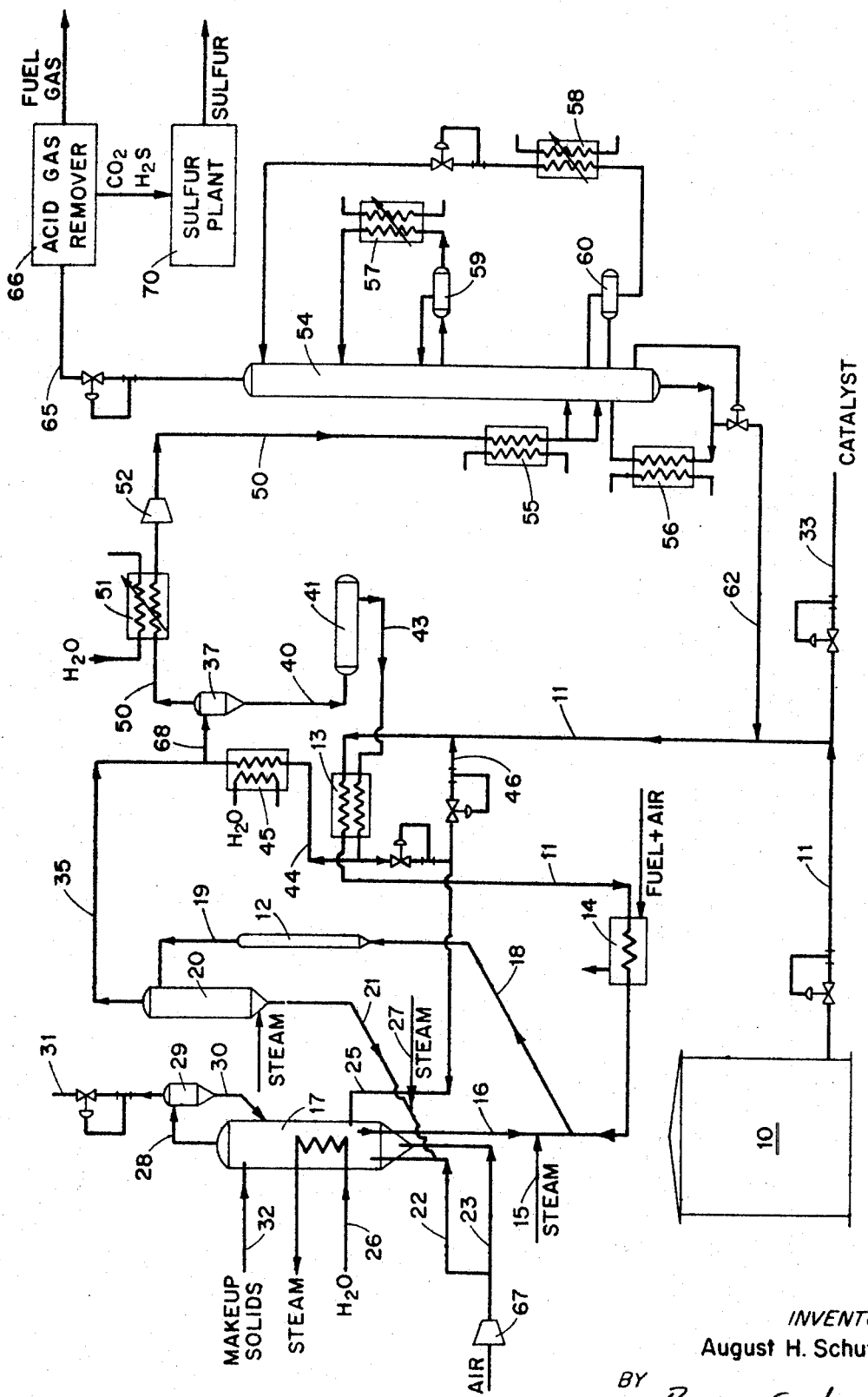

3,712,800
METHOD FOR CONVERTING RESIDUAL OILS
INTO FUEL GAS
August H. Schutte, Lexington, Mass., assignor to Arthur
D. Little, Inc., Cambridge, Mass.
Filed Sept. 4, 1970, Ser. No. 69,770
Int. Cl. C07c 3/00, 9/04
U.S. Cl. 48—197 R                                        4 Claims

ABSTRACT OF THE DISCLOSURE

Method and apparatus for converting residual hydrocarbon oils to a fuel gas which has essentially the same heating value and density as natural gas and which may therefore be distributed through the same lines. The residual oil containing one or more metallic modifiers as catalysts, which may be naturally occurring in the oil or added thereto, is pyrolyzed at low temperatures (up to 1400° F.) and low pressures (up to about 30 p.s.i.g.); and from the products of pyrolysis a fuel gas is separated. The fuel gas is a mixture of methane, hydrogen and ethane/ethylene wherein the molar ratio of hydrogen to ethane/ethylene is about one-to-one.

---

This invention relates to method and apparatus for processing heavy residual hydrocarbons and more particularly to processing residual hydrocarbons to produce a fuel gas which is directly substitutable for natural gas.

At present, natural gas is transported through pipelines from its source to its point of ultimate use. However, as the demand for natural gas increases, particularly in the large metropolitan areas difficulties are encountered in meeting these increased demands. The cost of transporting oil by tanker is less than half the cost of transporting natural gas by pipeline on an equal B.t.u. basis. Therefore, the use of oil as a raw material in a gasification plant located near a high volume regional market feeding directly into the distribution pipelines for the area appears attractive. Ideally, any process capable of converting residual hydrocarbons should be capable of using high-sulfur content, high-viscosity residual oils as feed. Such residual oils may also contain metal impurities and are looked upon as distress materials by the petroleum refiner. About the only way of using these residual oils at present is to blend them with valuable middle distillates to meet Bunker C specifications. Recent regulations, however, make even this way of using these residuals impractical because of the restrictions placed on the use of high-sulfur fuels.

It would therefore be highly desirable to have a method and apparatus capable of processing residual fuels or heavy crudes, to produce a sulfur-free fuel gas which may be added directly into the present natural gas distribution lines.

Prior art processes have been developed and used which convert heavy hydrocardon oils, or residuals, into a high heating value "oil gas" or into low heating value, high density gas containing carbon monoxide and nitrogen. Neither of these product gases is interchangeable with natural gas. Both of these contain heavy unsaturates containing three or more carbon atoms per molecule and appreciable quantities of aromatic distillates and tar are produced in making them. Other processes have been developed for cracking hydrocarbon oils, including crude oil, to produce ethylene. In a typical process of this type, the charge oil, after preheating, is contacted with an inert solid which provides the heat of cracking and acts as a recipient for the carbon which is formed. Part or all of the heat of reaction is provided by burning off the carbon from the solid material either in the reaction zone or in a separate zone. (See for example Hydrocarbon Processing 44: August 1965, pp. 205 and 207; Chemical Engineering 73: No. 17 pp. 122–124 (1966); and U.S. Pats. Nos. 2,526,696 and 2,908,625.) Since the purpose of these methods is to produce ethylene they are designed and operated to minimize the production of methane and hydrogen, products which are most desirable in the fuel gas desired to be made by the method of this invention. When these prior art methods are used with residual oils they produce 40 to 50 weight percent of intermediate olefins, diolefins, aromatics and heavy tar. (See Ind. Eng. Chem., 47:12, pp. 2470–4 (1955).) Thus, in summary, none of the prior art methods and apparatus are suitable for converting crude and residual oils to a sulfur-free fuel gas which is completely interchangeable with natural gas.

It is therefore a primary object of this invention to provide a method for converting residual oils to a sulfur-free fuel gas which has essentially the same heating value and density as natural gas, thus making it possible to interchange this fuel gas with methane or natural gas. It is another object to provide a method of the character described which uses as feed high-sulfur, high-metal content bottoms from crudes which are presently troublesome to burn. It is another object to provide a fuel gas from residual oil which is a mixture of methane, hydrogen, ethane and ethylene balanced to provide a density and heating value which approximate those of methane. Still another object of this invention is to provide a method of the character described which forms little, if any, carbon monoxide and thus eliminates the need to convert it into methane; which does not require tonnage oxygen; and which avoids the necessity of separating hydrogen from methane and methane from ethylene, both procedures requiring costly cryogenic separation systems.

Another primary object of this invention is to provide apparatus for converting residual oils to sulfur-free fuel gas of a character to make it interchangeable with natural gas. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying single drawing which is a schematic representation of the method and apparatus of this invention.

In the method of this invention the hydrocarbon oil feed, which may include crude oil and residual hydrocarbons from the processing of crudes or oil-shale or a combination of both, is subjected to pyrolysis at low pressures and in the presence of a small amount of steam. The temperature at which this process is carried out ranges between about 1000–1400° F. which is lower than the temperature used heretofore in the prior art process described. The oil partial pressures in the primary reaction zone, which range between 5 and 30 p.s.i.g., at which the gasification of the heavy oils takes place by the method of this invention are also far lower than in the prior art hydrogenation process. Because of the relative low temperatures and pressures used, the vapor reaction time must be extended to between about 2 and 10 seconds and the solids residence time in the secondary reaction zone to about 2 to 10 minutes. These operational conditions result in a maximum yield of methane and the production of only two final products—fuel gas and sulfur. The methane yield may be augmented by recycling to extinction all of the hydrocarbons which are heavier than ethane/ethylene with the exception of small quantities of heavy aromatic tar which may be burned as fuel. The overall yield of fuel gas is further enhanced by including in the product gas the hydrogen which is formed along with about one mol of an ethane/ethylene mixture for each mol of such product hydrogen. The resulting fuel gas has a heating value of from about 950 to 1000 B.t.u. per standard cubic foot, a Wobbe number of 1250 to 1400 and a Weber flame speed factor lower than 25. It is thus interchangeable with natural gas.

Maximum methane yield from the pyrolysis carried out in the method of this invention is favored by the relatively low temperature used. However, as noted, these low temperatures decrease the reaction rate and it is therefore preferable to have present in the feed a small quantity of a modifying agent or agents. These modifying agents, which include dispersible metals such as vanadium, nickel, iron and chromium, may be considered to serve in the role of catalysts, in that they increase the reaction rate. As will be noted below in connection with the description of the drawing, they will be continuously removed along with the carbon by-product and hence must be continuously returned to the system.

The organo-metallic compounds containing vanadium and nickel which are present in Venezuelan, Middle Eastern and some California crudes may serve as the necessary catalysts for the method of this invention when these oils, or residual hydrocarbons derived from them, are used as feed. The presence of these organo-metallic compounds has always previously presented problems to refiners seeking maximum gasoline yields. If the residual hydrocarbon feed has these metal impurities dispersed in it, then it may not be necessary to add additional catalytic material. However, in some cases it may be preferable to augment or modify the catalytic action of these naturally-occurring vanadium and nickel compounds by introducing other compounds, such as dispersible iron and chromium compounds into the feed, or in solid form into the reaction zone or as both forms into the feed and the reaction zone as well. If, of course, the hydrocarbon feed material contains little or none of these metal impurities, than the catalytic material must be added at one or more appropriate points in the cycle.

The method and apparatus of this invention may be described in further detail with reference to the drawing which is a somewhat simplified flow diagram and schematic representation of the apparatus. In order to simplify the drawing and at the same time clarify the flow patterns for the various components, all pumps, gages and the like have been omitted. The placement and use of these is well within the skill of anyone knowledgeable in the art.

The hydrocarbon oil feed, which may be residual fuel oil, topped crude or whole crude, is supplied from a charge tank 10 and introduced through a valve-controlled line 11 into primary reaction zone 12 which may be a dilute phase fluidized bed, dense phase fluidized bed, transport reactor or any other type of reactor suitable for contacting the feed with heated particles. The oil feed is preheated in a suitable heat exchanger 13 by indirect heat exchange with reactor effluent quench oil as explained below. Another process heater 14 is provided which makes it possible to heat the feed oil by the products of combustion of fuel and air. Preheating by means of fired heater 14 may be used for starting up the cycle and, if desired, to augment the preheating achieved in heat exchanger 13. A stream of hot inert solid particles, such as sand, alumina, coke and the like is carried in line 16 connecting the particle regenerator 17 with the oil feed line 11. A controlled amount of steam is introduced by line 15 into the solids feed line 16 prior to that point where the oil feed is introduced, to prevent back-flow of oil vapors into particle regenerator 17.

The mixed stream of oil feed and hot solid particles is carried through line 18 into reaction zone 12 by the flow of vapors produced by vaporization of the feed. By maintaining primary reaction zone 12 between about 1000 and 1400° F. and at an oil partial pressures between about 5 and 30 p.s.i.g., the desired pyrolysis of the oil takes place to form methane, hydrogen, ethylene, ethane and higher hydrocarbons. Under these conditions the partial pressure of gases produced renders the vaporization of the heavy hydrocarbon charge, including the organometallic compounds, nearly complete so that pyrolysis occurs mainly in the vapor phase. Only the very heavy (300–500 molecular weight) tar formed will be deposited as liquid on the surfaces of the solid particles. The metals forming the catalyst, or modifying agent, are deposited on the hot particles which are removed, along with the product gases by way of line 19 into a cyclone separator (or any other suitable separating means), located in the upper section of secondary reaction-separator 20. The solid particles are here separated from the primary gaseous products and introduced into secondary reaction zone of reactor-separator 20. Here the solid particles, carrying most of the metal compounds present in or added to the original feed and the liquid heavy tars formed in the primary reactor are removed from the partial pressure effect of the light gaseous compounds, the vaporization of the liquid film on the particles is thus constrained and a relatively long time liquid phase pyrolysis occurs which converts the heavy tar into coke, gas and recycle hydrocarbons. The solids are then taken by line 21 along with air from line 22 into the particle regenerator 17. Air is also introduced into the bottom of the particle regenerator 17 from line 23. The air in particle regenerator 17 is used to burn off the carbon deposited upon the solids and to burn the heavy tar components introduced into the particle regenerator through line 25. Excess combustion heat may be removed by steam generation in coils 26. This steam may be used to supply steam to line 15 and to line 27 which introduce seal steam into the particle transfer system and, more importantly, to drive compressors 52 and 67. Some fine particles, as well as oxides of the aforementioned metal compounds, are removed along with the flue gas through drawoff line 28 into separator 29 from which the larger particles are returned through line 30 to the particle regenerator 17. The solids level in particle regenerator 17 is maintained by controlling the flow of solids to the primary reaction zone 12 by the system previously described. The flue gases from separator 29 are removed through a valved-controlled line 31 to a CO boiler or other suitable disposal means (not shown). Makeup solids or makeup catalyst, if required, may be introduced in solid form into the particle regenerator as through line 32. Makeup catalyst may also be dispersed in a suitable liquid and introduced into oil feed line 11 such as through the valve-controlled line 33.

Returning now to the secondary reactor-separator 20, the gaseous products from the pyrolysis reaction in both the primary and secondary reaction zones are withdrawn through line 35 and quenched by a cool circulating stream of heavy tar as at line 68 before introduction into separator 37. These gaseous products comprise components ranging from hydrogen to a heavy aromatic distillate and heavy tars. The heavy tar liquid after quenching is separated out for use as a heat exchange fluid in a quenching system, as process fuel in the particle regenerator or as recycle feed to the oil feed stream. The tars are transferred from separator 37 through line 40 into an accumulator 41 from where they are discharged through line 43 to flow through heat exchanger 13 to preheat the incoming feed oil stream in line 11. After passing through the heat exchanger 13, the tar may be recycled by way of line 44 into separator 37 after being cooled by indirect heat exchange with water in heat exchanger 45; it may be taken to the particle regenerator 17 through line 25 to be used as fuel; or it may be recycled to the oil feed stream 11, being taken there by means of line 46. Generally, it will be preferable to recycle most of the tar, using only a small amount of it as fuel, The vapor product from separator 37 consists now of those components ranging from hydrogen to heavy aromatic distillate. This vapor product is withdrawn from separator 37 through line 50, cooled in heat exchanger 51, compressed in compressor 52 to about 500 p.s.i.g. and put through a de-ethanizer system. The de-ethanizer system is known in the art and comprises, as shown in the drawing a fractionating absorber tower 54, a series of heat exchangers 55, 56, 57 and 58, accumulators 59 and 60 and associated transfer lines. The bottom product from the de-ethanizer, which comprises all materials heavier than ethane/ethylene, is withdrawn through line 62 and recycled to feed stream 11.

The overhead gas from the de-ethanizer is conducted by a valve-controlled line 65 into an acid gas remover 66 which separates out the carbon dioxide and hydrogen sulfide to give the desired fuel gas product. The sulfur may be recovered as elemental sulfur in a sulfur plant 70 of known design and operation.

In operating the de-ethanizer the ethane/ethylene fraction will be split and the fractionation tower 54 will be controlled by temperature, pressure and absorbent flow to produce an overhead gas having essentially the same specific gravity as methane but composed of the methane produced plus the hydrogen produced with it plus approximately one mol of ethane/ethylene per mol of hydrogen. Thus the operation of the tower will be controlled simply and effectively to maintain a suitable gas density of the product fuel gas.

The thermal and material balances in the method of this invention are important from the standpoint of economics. As an example of operation of the plant illustrated, assume the production of 25 million s.c.f.d. of gas having a composition of 31 volume percent hydrogen, 35 volume percent methane and 34 volume percent ethane/ethylene. The charge would be 5,650 barrels per day of a 15° API reduced crude and the solids circulation between the reactor 12 and the particle regenerator 17 would be one million pounds per hour. The temperature drop of the solids in the reactor 12 and the temperature rise of the solids in the particle regenerator would be about 500° F. In this example, the reactor operates at 1200° F. and 7–15 p.s.i.g. while the particle regenerator operates at 1700° F. and 5–10 p.s.i.g. pressure. As noted previously, the reactor temperature may range from about 1000 to 1400° F. and the reaction time in the primary reactor 12 is adjusted accordingly to a value between about 2 and 10 seconds. A primary reactor 12 to handle the quantities of this example will have an internal diameter of about 6 feet and a length of about 78 feet; the secondary reactor 20 will be 14 feet in diameter by 50 feet long and the particle regenerator 17 will have an internal diameter of about 16 feet and a length of 40 feet. The quantity of carbon burned in the regenerator will be about 16,000 pounds per hour which is equivalent to a small 15000-barrel per day fluid cracker. The weight percent carbon on the solids entering the particle regenerator will be 1.6%. The air compressor 67 required to handle the air into the particle regenerator should have a power requirement of 3600 horsepower and the product gas compressor 52 a power requirement of 6500 horsepower. The de-ethanizer operates at a pressure of about 500 p.s.i.g. and the product fuel gas enters the distribution mains at this pressure.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawing shall be interpreted as illustrative and not in a limiting sense.

I claim:
1. A method of forming a fuel gas interchangeable with natural gas, comprising the steps of
   (a) contacting in a primary reaction zone an oil feed formed primarily of residual hydrocarbons and containing as a catalyst a metallic modifying agent which contains vanadium, nickel or mixtures thereof and which is added to said oil feed if not naturally present therein with a small amount of steam and heated solid particles thereby to pyrolyze said oil feed at a temperature between about 1000 and 1400° F. under an oil partial pressure from 5 to 30 p.s.i.g. for a time between about 2 and 10 seconds thereby to form a gaseous product mixture of methane, hydrogen, ethane, ethylene, higher hydrocarbons and tars and to deposit high molecular weight tars on said solid particles;
   (b) separating said gaseous product mixture from said solid particles containing said high molecular weight tar deposit;
   (c) holding the solid particles from step (b) without any additionally added heat in a secondary reaction zone out of contact with said gaseous product mixture of step (a) for between about 2 and 10 minutes thereby to complete the conversion of said tar deposited on said particles into solid coke and vaporized hydrocarbons, whereby said vaporized hydrocarbons contain a large proportion of methane;
   (d) thereafter burning off said coke from said particles to reheat said particles for recycle to step (a);
   (e) removing said tars from said gaseous product mixture of step (a) to provide a tar-free gaseous product mixture;
   (f) compressing said tar-free gaseous product mixture from step (e);
   (g) fractionating the compressed gaseous product mixture of step (f) to remove said higher hydrocarbons and produce a gaseous fuel mixture of methane, hydrogen, ethane and ethylene in which the molar ratio of hydrogen to the ethane/ethylene component is about one-to-one; and
   (h) removing any hydrogen sulfide from said gaseous fuel mixture of step (g) to form fuel gas having a heating value and density approximating that of methane.

2. A method in accordance with claim 1 including the step of adding a dispersible iron compound, chromium compound or mixtures thereof to said catalyst.

3. A method in accordance with claim 1 including the steps of
   (i) adding said higher hydrocarbons removed in step (g) to said feed oil; and
   (j) using said tars removed in step (e) as heavy recycle fed and as fuel in step (d).

4. A method in accordance with claim 1 including the step of preheating said oil feed prior to introducing it into said primary reaction zone.

References Cited

UNITED STATES PATENTS

| | | | |
|---|---|---|---|
| 2,526,696 | 10/1950 | Schutte | 208—54 |
| 2,789,084 | 4/1957 | Schutte | 208—54 |
| 2,908,625 | 10/1959 | Mekler et al. | 208—54 |
| 2,744,814 | 5/1956 | Francis | 48—214 X |

OTHER REFERENCES

Sheldrick, Chemical Engineering, vol. 73, No. 17, pp. 122–124 (Aug. 15, 1966).

JOSEPH SCOVRONEK, Primary Examiner

U.S. Cl. X.R.

48—94, 102, 105, 211, 214; 208—52, 127